United States Patent
Ferber

(10) Patent No.: US 6,996,471 B2
(45) Date of Patent: Feb. 7, 2006

(54) ADDING A SIGNAL TO SEISMIC DATA

(75) Inventor: Ralf Ferber, West Sussex (GB)

(73) Assignee: WesternGeco, L.L.C., Houston, TX (US)

( * ) Notice: Subject to any disclaimer, the term of this patent is extended or adjusted under 35 U.S.C. 154(b) by 234 days.

(21) Appl. No.: 10/725,814

(22) Filed: Dec. 2, 2003

(65) Prior Publication Data

US 2005/0119831 A1    Jun. 2, 2005

(51) Int. Cl.
   *G01V 1/00*    (2006.01)
(52) U.S. Cl. ........................................................ 702/17
(58) Field of Classification Search ................. 702/14, 702/17, 18, 6; 367/22, 21, 45, 55, 73
   See application file for complete search history.

(56) References Cited

U.S. PATENT DOCUMENTS

| | | | | |
|---|---|---|---|---|
| 3,432,806 A | * | 3/1969 | Rousso, Jr. | 367/55 |
| 4,281,403 A | * | 7/1981 | Siems et al. | 367/76 |
| 4,479,183 A | * | 10/1984 | Ergas | 702/17 |
| 4,556,962 A | * | 12/1985 | Widrow | 367/45 |
| 4,759,636 A | * | 7/1988 | Ahern et al. | 367/21 |
| 4,882,713 A | * | 11/1989 | Hughes | 367/47 |
| 5,077,698 A | * | 12/1991 | Beauducel | 367/79 |
| 5,084,844 A | * | 1/1992 | Wang | 367/59 |
| 5,206,835 A | * | 4/1993 | Beauducel | 367/21 |
| 5,550,787 A | * | 8/1996 | Rialan et al. | 367/77 |
| 5,572,483 A | * | 11/1996 | Chambers et al. | 367/45 |
| 5,920,828 A | * | 7/1999 | Norris et al. | 702/14 |
| 5,933,790 A | * | 8/1999 | Jeffryes | 702/17 |
| 6,002,339 A | * | 12/1999 | Norris | 340/690 |
| 6,002,640 A | * | 12/1999 | Harmon | 367/38 |

* cited by examiner

*Primary Examiner*—Donald McElheny, Jr.
(74) *Attorney, Agent, or Firm*—WesternGeco, L.L.C.

(57) ABSTRACT

The present invention provides a method and apparatus for analyzing seismic data. The method includes determining a portion of the seismic data recorded substantially before the arrival of a seismic signal and adding a test signal to the portion of the seismic data recorded substantially before the arrival of the seismic signal.

30 Claims, 5 Drawing Sheets

ADDING A SIGNAL TO SEISMIC DATA

BACKGROUND OF THE INVENTION

1. Field of the Invention

This invention relates generally to seismic surveying, and, more particularly, to adding a signal to seismic data.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, an array of marine seismic streamer cables is towed behind a survey vessel over a survey area. The seismic streamer cables may be several thousand meters long and contain a large number of sensors, such as hydrophones and associated electronic equipment, which are distributed along the length of the each seismic streamer cable. The survey vessel also tows one or more seismic sources, such as airguns and the like.

As the array is towed over the survey area, acoustic signals, or "shots," produced by the seismic sources are directed down through the water into the earth beneath, where they are reflected from the various subterranean geological formations. The reflected signals are received by the sensors in the seismic streamer cables, digitized and then transmitted to the survey vessel. The digitized signals are referred to as "traces" and are recorded, and at least partially processed, at the survey vessel. The ultimate aim of this process is to build up a representation of the subterranean geological formations beneath the array. Analysis of the representation may indicate probable locations of hydrocarbon deposits in the subterranean geological formations.

In addition to detecting the acoustic signals, the sensors in the seismic streamer cables may also detect acoustic noise from a variety of sources. For example, hydrophones distributed along the seismic cable may detect swell noise. The sensors do not distinguish between the desired acoustic signals and the undesirable acoustic noise, and so the recorded traces include both signal and noise. The accuracy and commercial value of the representation of the subterranean geological formations depends, at least in part, on the signal-to-noise ratio of the seismic data. For example, increasing the signal-to-noise ratio of the traces from a seismic survey typically allows a more accurate, and consequently more commercially valuable, representation of the subterranean geological formations to be formed. However, estimates of the signal-to-noise ratio of seismic data are difficult to obtain because the recorded acoustic signals are virtually always accompanied by an unknown amount of acoustic noise.

SUMMARY OF THE INVENTION

In one aspect of the present invention, a method is provided for analyzing seismic data. The method includes determining a portion of the seismic data recorded substantially before the arrival of a seismic signal and adding a test signal to the portion of the seismic data recorded substantially before the arrival of the seismic signal.

BRIEF DESCRIPTION OF THE DRAWINGS

The invention may be understood by reference to the following description taken in conjunction with the accompanying drawings, in which like reference numerals identify like elements, and in which.

Figure 1:
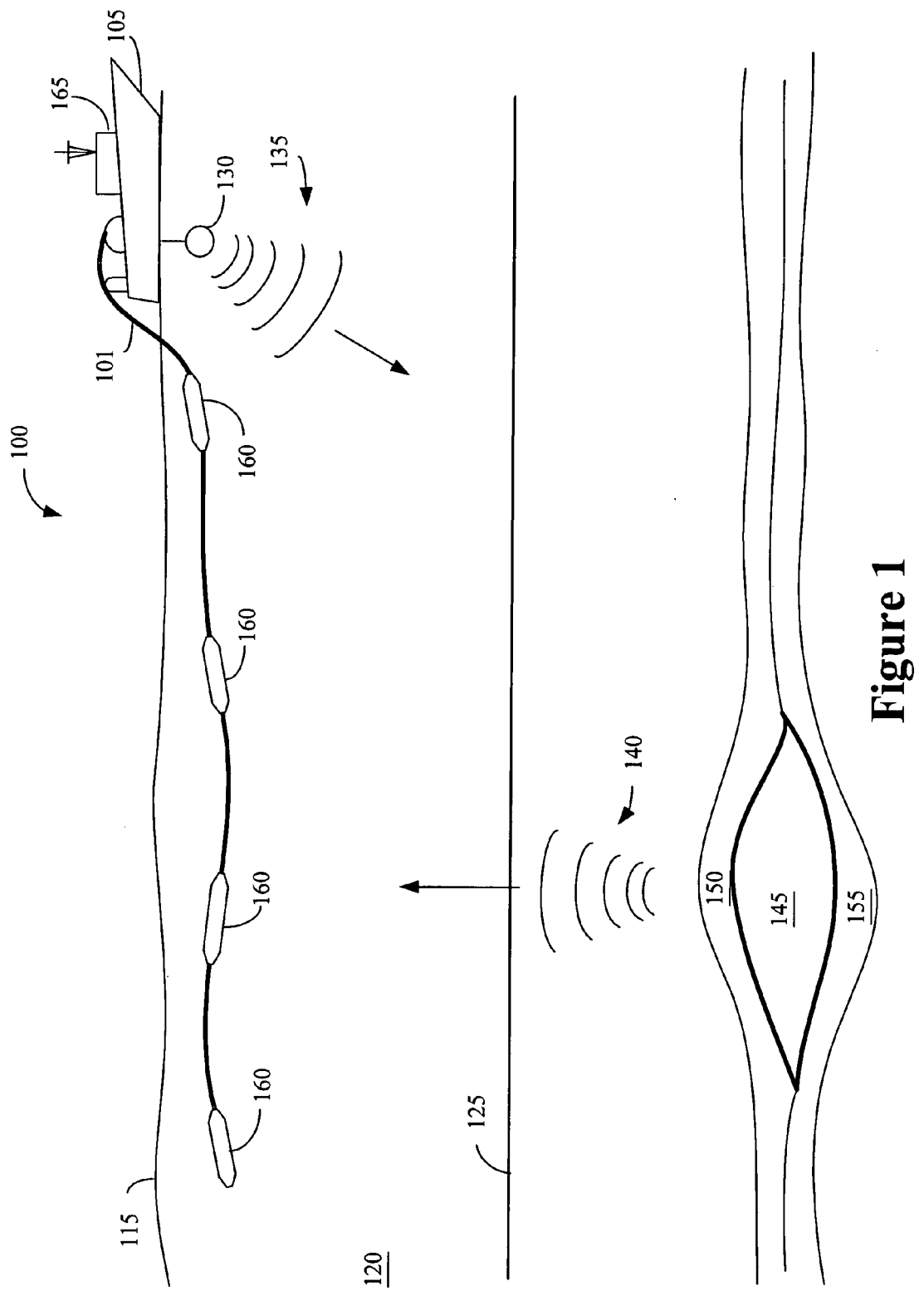
FIG. 1 shows an exemplary system for seismic surveying using a seismic cable.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows an exemplary system 100 for seismic surveying using a seismic cable 101. The exemplary system 100 includes a survey vessel 105, which deploys the seismic cable 101 below a surface 115 of a body of water 120, which, in alternative embodiments, may be freshwater, salt water, or brackish water. The seismic cable 101 is deployed by off-loading the seismic cable 101 from the survey vessel 105. In the illustrated embodiment, the seismic cable 101 is submerged at a depth intermediate the surface 115 and the floor 125. However, the present invention is not so limited. In one alternative embodiment, the seismic cable 101 is deployed on the surface 115 of the body of water 120. In another alternative embodiment, the deployed seismic cable 101 may descend through the catenary to be positioned on the floor 125 of the body of water 120. For example, the seismic cable 101 may be deployed in a sea, descend to a sea bed, and then be positioned on the sea bed.

In various alternative embodiments, the seismic cable 101 may be used in a single cable system or be one of an array of streamer cables (not shown). Furthermore, although the present invention will be described herein in the context of the exemplary system 100 for marine seismic surveying, persons of ordinary skill in the art will appreciate that the present invention is not so limited. For example, in one alternative embodiment, the seismic cables 101 may be deployed on land.

One or more seismic sources 130 provide a seismic survey signal 135. In the illustrated embodiment, the seismic source 130 is suspended beneath the survey vessel 105. However, in alternative embodiments, the seismic source 130 may be deployed in any desirable location. For example, the seismic source 130 may be deployed on the surface 115 proximate the seismic cable 101 on a buoy or other flotation device. For another example, the seismic source 130 may be deployed on a cable, including, but not limited to the seismic cable 101, that is coupled to the survey vessel 105 or a second vessel (not shown). For yet another example, the seismic sources 130 may be towed by a second vessel (not shown).

The seismic survey signal 135 provided by the seismic source 130 propagates into the earth and forms a reflected signal 140 when the seismic survey signal 135 reflects from one or more geologic formations 145, such as hydrocarbon deposits, which are located in earth strata 150, 155. One or more sensors 160 are coupled to the seismic cables 101 and receive the reflected signals 140. In various alternative embodiments, the one or more sensors 160 may be geophones, hydrophones, and the like. After being received by one or more sensors 160, the reflected signals 140 are transmitted to a signal processing unit 165. In one embodiment, the signal processing unit 165 is deployed on the survey vessel 101. However, in alternative embodiments, portions of the signal processing unit 165 may be deployed at any desirable location including, but not limited to, other vessels (not shown) and on land. Analysis of the reflected signals 140 may be used to form a representation of the geologic formations 145, 150, 155. In one embodiment, the analysis includes the application of a digital groupforming (DGF) process. However, the present invention is not limited to analyses using the DGF process. In alternative embodiment, other analysis techniques, such as analog groupforming and the like, may be used.

Figure 2:
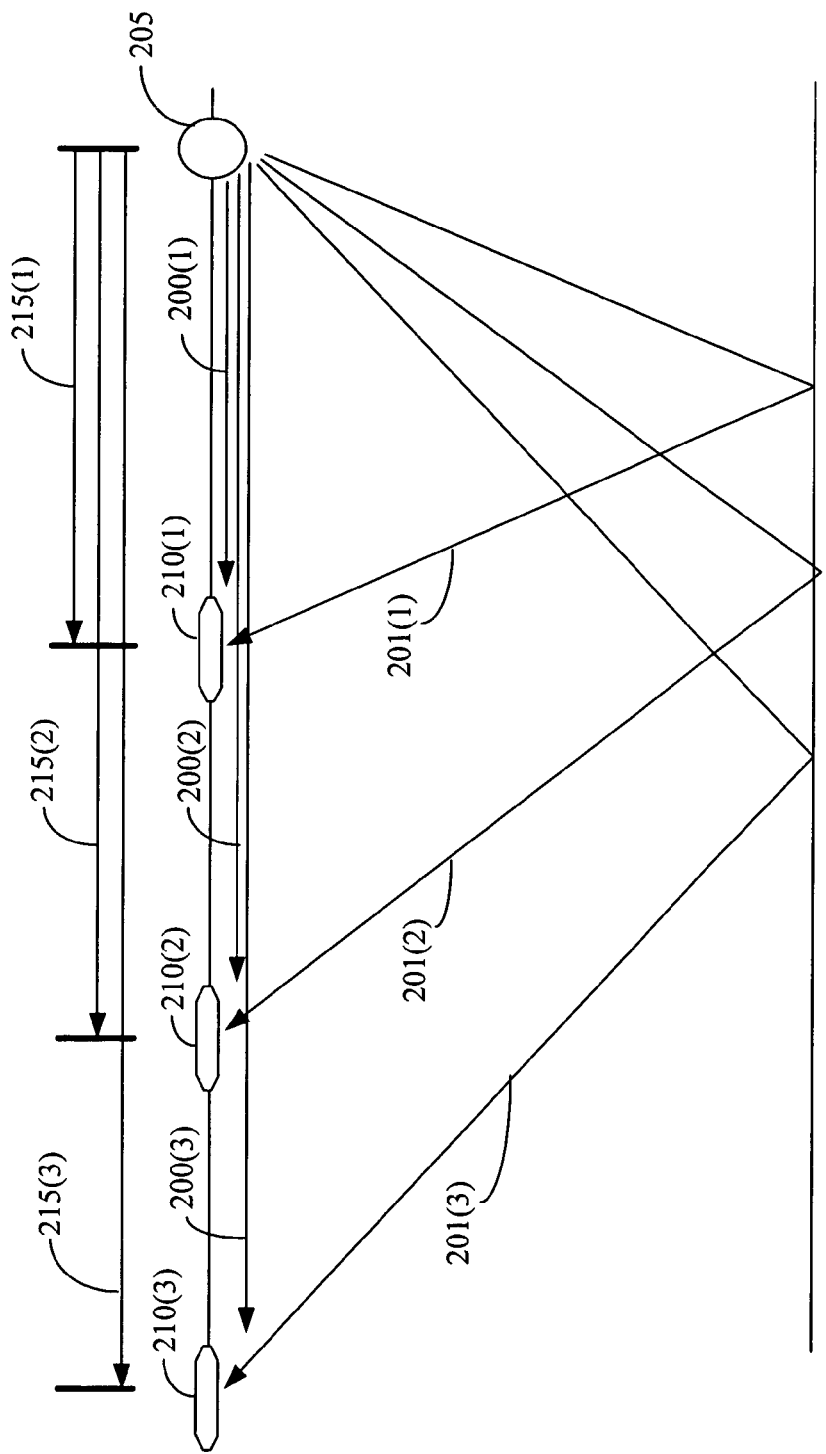
FIG. 2 conceptually illustrates a plurality of direct signal paths and a plurality of reflected signal paths from a seismic source to a plurality of seismic sensors, which may be deployed on the seismic cable shown in FIG. 1.

FIG. 2 conceptually illustrates a plurality of direct signal paths 200(1–3) and a plurality of reflected signal paths 201(1–3) from a seismic source 205 to a plurality of seismic sensors 210(1–3), which are displaced from the seismic source by a corresponding plurality of offsets 215(1–3). When the seismic source 205 fires an acoustic signal, or "shot," the acoustic signal propagates along the direct and reflected signal paths 200(1–3), 201(1–3) to the corresponding sensors 210(1–3). Due to the finite speed of sound, the sensors 210(1–3) first receive a portion of the acoustic signal after an elapsed time approximately equal to the offset 215(1–3) divided by the speed of sound. For example, a typical elapsed time in a marine seismic survey is about several hundred milliseconds. Additional portions of the acoustic signal, such as those traveling along the reflected signal paths 201(1–3), are received by the sensors 210(1–3) at a later time.

Figure 3:
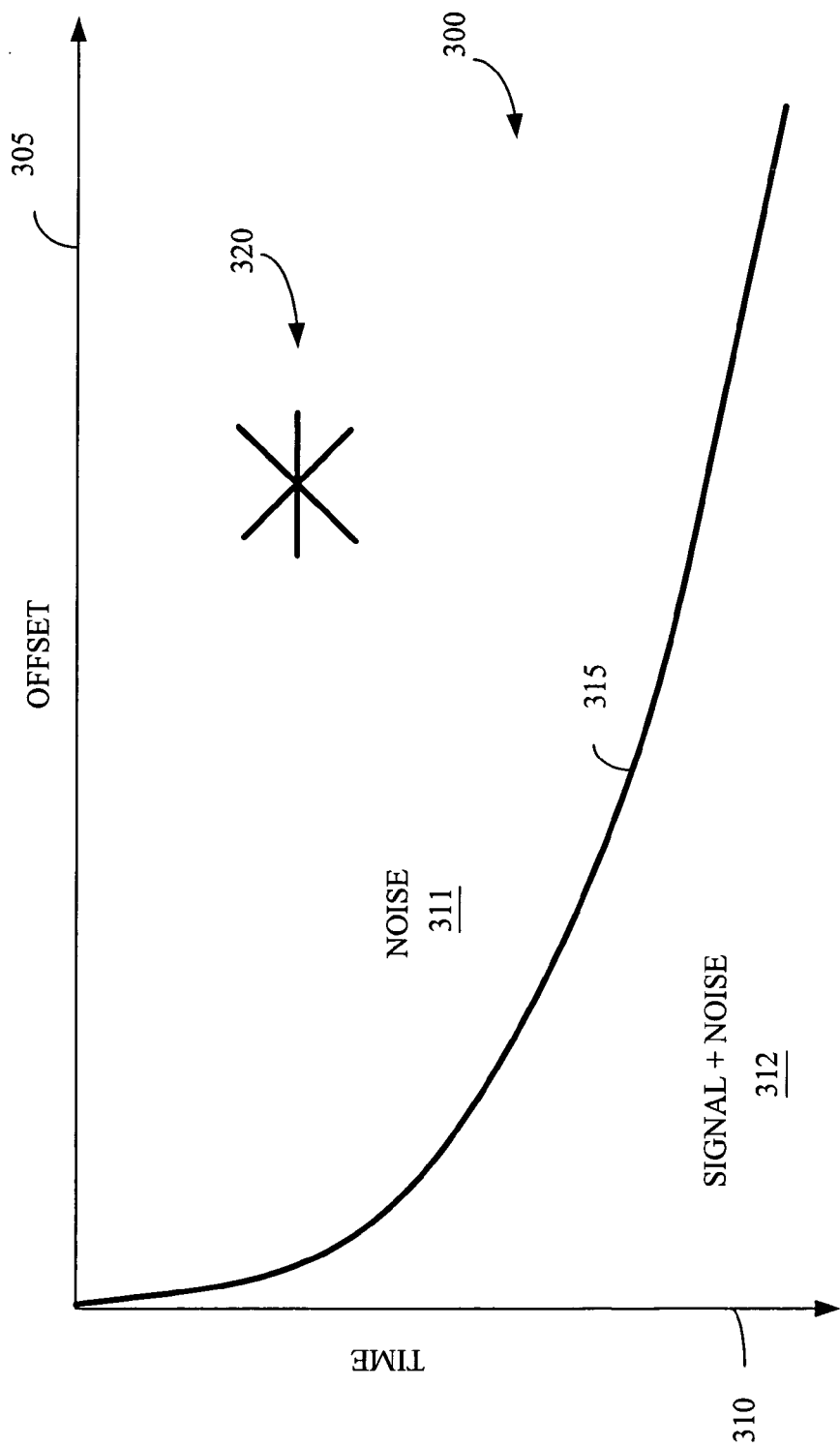
FIG. 3 conceptually illustrates seismic data, such as may be collected by the seismic sensors shown in FIG. 1.

FIG. 3 conceptually illustrates seismic data 300, such as may be collected by the sensors 160 shown in FIG. 1. The seismic data 300 is shown as a function of the seismic sensor offset (indicated by the axis 305) and the elapsed time since the seismic shot (indicated by the axis 310), and may be approximately separated into two regions by the first break 315. Although not necessary for the practice of the present invention, in one embodiment, the seismic data may be normal-move-out corrected, as will be appreciated by persons of ordinary skill in the art. The first break 315 at a given offset 305 approximately corresponds to the elapsed time since the seismic shot 310 for an acoustic signal propagating along a direct signal path, such as the direct signal paths 200(1–3) shown in FIG. 2.

In the illustrated embodiment, the elapsed time since the seismic shot 310 increases downward, as indicated by the arrow on the axis 310. At elapsed times 310 approximately equal to and greater than the first break 315, the signals recorded by the sensors include noise and seismic signal from the corresponding seismic shot. For example, in a marine seismic survey, the noise may include swell noise, and for land data, the noise may include wind noise. At elapsed times 310 prior to the first break 315 (for a given offset 305), the signals recorded by the sensors, e.g. the sensors 210 (1–3) shown in FIG. 2, are substantially pure noise and contain substantially no seismic signal from the corresponding seismic shot.

A test signal 320 is added to the portion of the seismic data recorded substantially before the arrival of the seismic signal. For example, the test signal 320 may be added to the signals recorded by the sensors at elapsed times 310 prior to the first break 315 (for a given offset 305). In one embodiment, the test signal 320 is an artificial pure signal record that is added to the recorded seismic data and/or a separate copy of the recorded seismic data. For example, the test signal 320 may be a so-called "star shaped" test signal 320, as shown in FIG. 3. The various branches of the star shaped test signal 320 correspond to positive, negative, and zero dip geologic layers, as will be appreciated by those of ordinary skill in the art. However, the shape of the test signal 320 is not material to the present invention, and any desirable test signal 320 may be used without departing from the scope of the present invention. In one embodiment, the test signal 320 may also correspond to a range of move out times.

The test signal 320 may be used to determine an estimated signal-to-noise ratio for the portion of the seismic data recorded at and/or substantially after the arrival of the seismic signal at the sensors. Consequently, the test signal 320 may be used to quantify the benefit of various data processing techniques, including, but not limited to, digital groupforming of single sensor recordings of seismic data.

Figure 4:
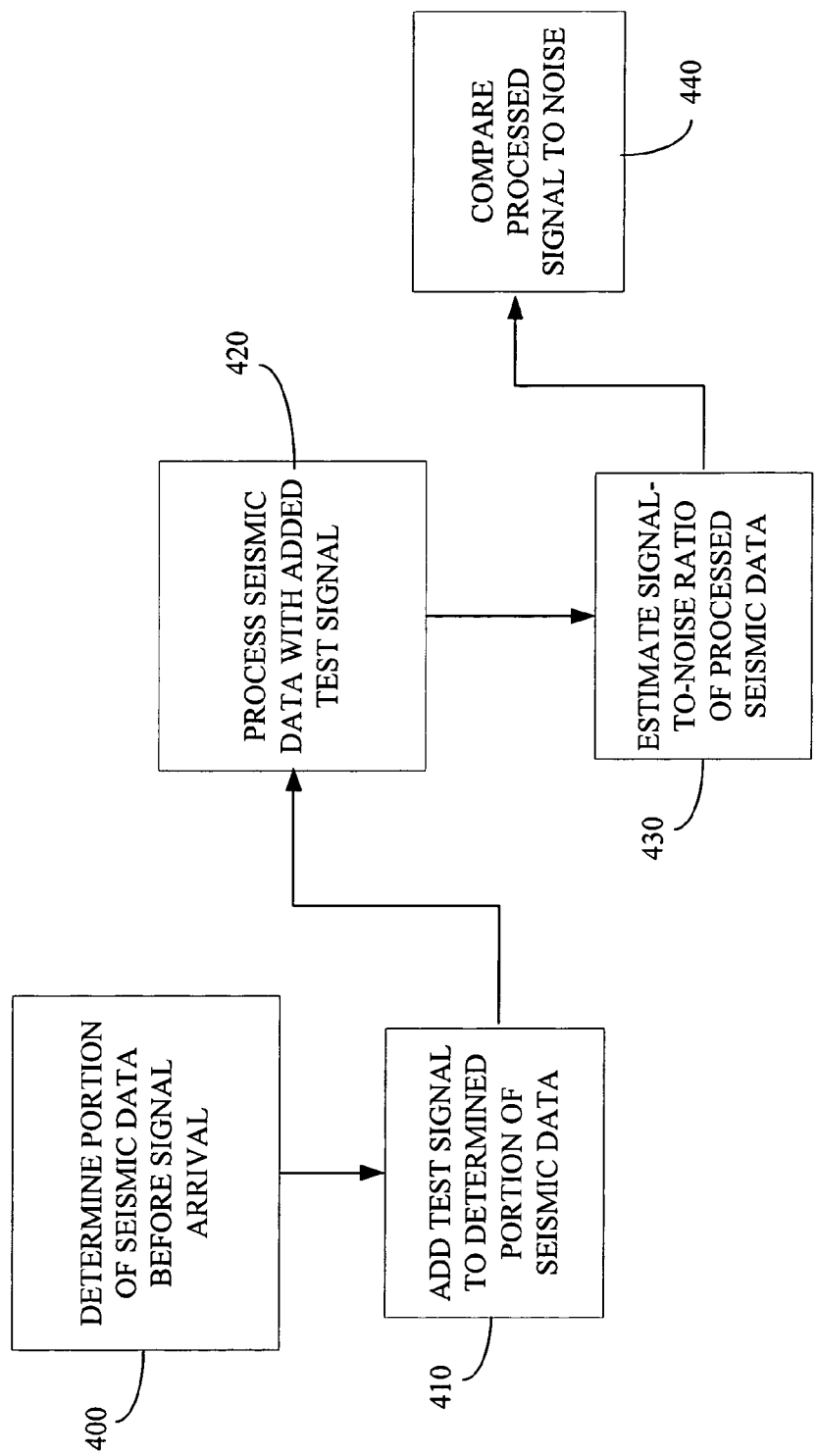
FIG. 4 illustrates one embodiment of a method of estimating the signal-to-noise ratio of processed seismic data.

FIG. 4 illustrates one embodiment of a method of estimating the signal-to-noise ratio of processed seismic data. A portion of the seismic data recorded substantially before the arrival of the acoustic signal from the seismic source may be determined (at 400). In one embodiment, the portion of the seismic data recorded substantially before the arrival of the acoustic signal from the seismic source may be determined (at 400) by determining (at 400) the location of the first break in the seismic data, as described above. For example, the determined (at 400) portion of the seismic data may include a signal-free portion of the plurality of individual single sensor records, which may cover an offset range of several consecutive output traces.

A test signal, such as the test signal 320 shown in FIG. 3, is then added (at 410) to the determined portion of the seismic data. In one embodiment, the test signal may be added (at 410) by summation. The test signal may have a range of amplitudes and be representative of a range of dips. For example, the test signal may be representative of dips ranging from zero to the maximum dip that is supposed to be preserved by the subsequent data processing, such as a digital groupforming process and/or an analog groupforming process. In one embodiment, the amplitude of the test signal may be approximately equal to an expected signal strength measured in the physical units of the acquisition system. However, in alternative embodiments, any desirable scaling of the test signal may be used.

As discussed above, the test signal may be added (at 410) directly to the recorded data or to a copy of the recorded data. Since the test signal has been added (at 410) to the portion of the seismic data recorded substantially before the arrival of the acoustic signal, the signal-to-noise ratio corresponding to the test signal that has been added to the portion of the seismic data recorded substantially before the arrival of the acoustic signal may be known. In one embodiment, the seismic data, including the test signal, is processed (at 420) using a digital groupforming process. However, the present invention may be applied to seismic data that is processed (at 420) using other techniques including, but not limited to, analog groupforming processes.

The signal-to-noise ratio of the seismic data may then be estimated (at 430) using the test signal. In one embodiment, the processed seismic data containing the test signal may be compared to the unprocessed test signal. For example, a difference between the test signal and the processed test signal may be estimated (at 430). If the signal is totally separated from the noise, the estimated difference would be approximately zero. However, it will be appreciated by those of ordinary skill in the art that the signal and the noise are rarely, if ever, totally separated and thus, the estimated difference will rarely, if ever, be zero. However, a large estimated difference may indicate that an undesirably large amount of noise is leaking into the signal, which may indicate that the performance of the data processing was poor.

In various alternative embodiments, the strength of the estimated difference may be compared (at 440) to the strength of the noise. For example, a noise percentage, $S_{err}$, passing through the data processing may be estimated by comparing (at 440) the digital groupforming process to the test signal using the formula:

$$S_{err} = \frac{\|DGF(s+n) - s\|}{\|n\|},$$

where DGF indicates the digital groupforming process, s indicates the test signal, and n indicates the noise. The double vertical bars indicate the root-mean-square value of the quantity within the double bars. For another example, a performance factor, P, may be computed by comparing (at 440) a digital groupforming process to an analog groupforming process, indicated by AGF, using the formula:

$$P = \frac{\|DGF(s+n) - s\|}{\|AGF(s+n) - s\|}.$$

However, the present invention is not limited to the aforementioned measurements. In alternative embodiments, any desirable measure of the relative strength of the test signal in the noise may be used. Moreover, the present invention is not limited to digital and/or analog groupforming processes. In alternative embodiments, any desirable data processing techniques may be used.

Figure 5A:
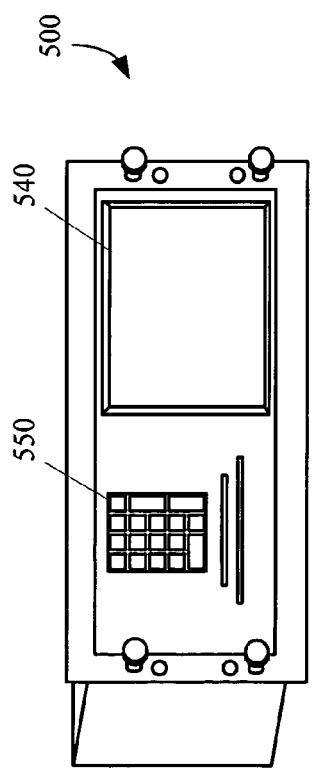
FIGS. 5A and 5B show an exemplary computing apparatus that may be used to perform the operations described in reference to FIG. 4.
Figure 5B:
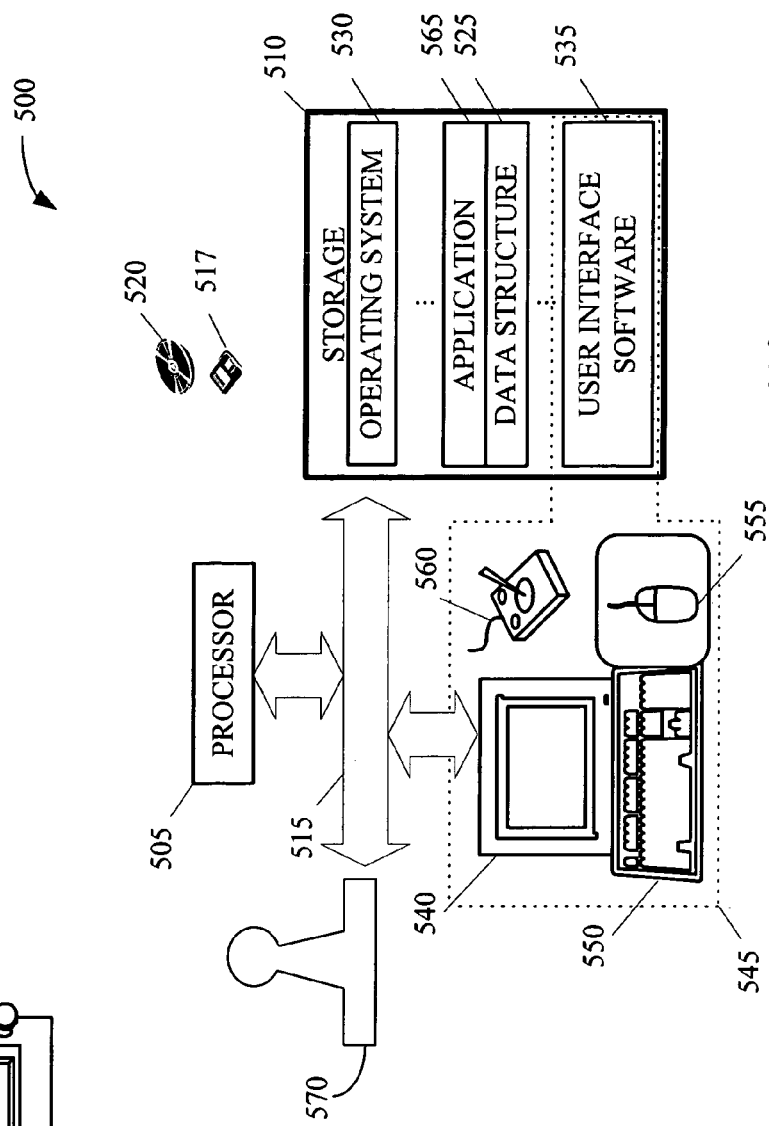

FIGS. 5A and 5B show an exemplary computing apparatus 500 that may be used to perform the aforementioned operations. The computing apparatus 500 includes a processor 505 communicating with some storage 510 over a bus system 515. The storage 510 may include a hard disk and/or random access memory ("RAM") and/or removable storage such as a floppy magnetic disk 517 and an optical disk 520. The storage 510 is encoded with a data structure 525 storing the signals collected as discussed above, an operating system 530, user interface software 535, and an application 565.

The user interface software 535, in conjunction with a display 540, implements a user interface 545. The user interface 545 may include peripheral I/O devices such as a key pad or keyboard 550, a mouse 555, or a joystick 560. The processor 505 runs under the control of the operating system 530, which may be practically any operating system known to the art. The application 565 is invoked by the operating system 530 upon power up, reset, or both, depending on the implementation of the operating system 530.

As discussed above, data collected during the marine seismic survey may be communicated to the computing apparatus 500 via any storage medium, including, but not limited to, recording tape, magnetic disks, compact disks, and DVDs. The data collected during the marine seismic survey may also be communicated directly to the computing apparatus 500 by, e.g., a satellite link 570, and stored in the storage 510. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of analyzing seismic data, comprising:
   determining a portion of the seismic data recorded substantially before the arrival of a seismic signal; and
   adding a test signal to the portion of the seismic data recorded substantially before the arrival of the seismic signal.

2. The method of claim 1, wherein determining the portion of the seismic data recorded substantially before the arrival of the seismic signal comprises determining the location of a first break in the seismic data.

3. The method of claim 1, wherein determining the portion of the seismic data comprises determining a portion of the seismic data containing noise and substantially no seismic signal.

4. The method of claim 1, wherein the seismic data is recorded by a seismic sensor having an offset from a seismic source, and wherein determining the portion of the seismic data comprises determining an arrival time of the seismic signal based upon the offset.

5. The method of claim 1, wherein adding the test signal comprises selecting the test signal.

6. The method of claim 5, wherein selecting the test signal comprises selecting the test signal having a range of amplitudes.

7. The method of claim 5, wherein selecting the test signal comprises selecting the test signal corresponding to a range of dips.

8. The method of claim 5, wherein selecting the test signal comprises selecting the test signal corresponding to a range of move out times.

9. The method of claim 1, further comprising processing the seismic data and the added test signal.

10. The method of claim 9, wherein processing the seismic data and the added test signal comprises processing the seismic data and the added test signal using a group forming process.

11. The method of claim 10, wherein processing the seismic data and the added test signal using a group forming process comprises processing the seismic data and the added test signal using a digital group forming process.

12. The method of claim 9, further comprising estimating a signal-to-noise ratio of the processed seismic data using the added test signal.

13. The method of claim 9, further comprising estimating a difference between the processed test signal and the noise.

14. The method of claim 13, wherein estimating the difference comprises comparing the estimated difference to the noise.

15. The method of claim 13, wherein estimating the difference comprises comparing the estimated difference for different processing techniques.

16. The method of claim 15, wherein comparing the estimated difference for different processing techniques comprises comparing the estimated difference for a digital and an analog groupforming process.

17. An article comprising one or more machine-readable storage media containing instructions that when executed enable a computer to:
   determine a portion of the seismic data recorded substantially before the arrival of a seismic signal; and
   add a test signal to the portion of the seismic data recorded substantially before the arrival of the seismic signal.

18. The article of claim 17, wherein determining the portion of the seismic data recorded substantially before the arrival of the seismic signal comprises determining at least one of a location of a first break in the seismic data and an arrival time of the seismic signal.

19. The article of claim 17, wherein determining the portion of the seismic data comprises determining a portion of the seismic data containing noise and substantially no seismic signal.

20. The article of claim 17, wherein adding the test signal comprises selecting the test signal.

21. The article of claim 20, wherein selecting the test signal comprises selecting the test signal having at least one of a range of amplitudes, a range of dips, and a range of move out times.

22. The article of claim 17, further comprising instructions that when executed enable the computer to process the seismic data and the added test signal.

23. The article of claim 22, wherein processing the seismic data and the added test signal comprises processing the seismic data and the added test signal using a digital group forming process.

24. The article of claim 17, further comprising instructions that when executed enable the computer to estimate a signal-to-noise ratio of the seismic data using the added test signal.

25. An article comprising one or more machine-readable storage media containing data structures and data formed by:
   determining a portion of the seismic data recorded substantially before the arrival of a seismic signal; and
   adding a test signal to the portion of the seismic data recorded substantially before the arrival of the seismic signal.

26. The article of claim 25, wherein determining the portion of the seismic data recorded substantially before the arrival of the seismic signal comprises determining at least one of a location of a first break in the seismic data and an arrival time of the seismic signal.

27. The article of claim 25, wherein adding the test signal comprises selecting the test signal having at least one of a range of amplitudes, a range of dips, and a range of move out times.

28. The article of claim 25, further comprising data structures and data formed by processing the seismic data and the added test signal.

29. The article of claim 28, wherein processing the seismic data and the added test signal comprises processing the seismic data and the added test signal using a digital group forming process.

30. The article of claim 25, further comprising data structures and data formed by estimating a signal-to-noise ratio of the seismic data after processing the data using the added test signal.

* * * * *